United States Patent [19]

Martin et al.

[11] 4,232,800
[45] Nov. 11, 1980

[54] APPARATUS FOR DISPENSING ROLLED NEWSPAPERS AND THE LIKE

[75] Inventors: Dennis R. Martin, 2309 State St., Saginaw, Mich. 48602; George O. Hopper, Jr., Saginaw, Mich.

[73] Assignee: Dennis R. Martin, Saginaw, Mich.

[21] Appl. No.: 30,537

[22] Filed: Apr. 16, 1979

[51] Int. Cl.³ .............................................. B65G 59/06
[52] U.S. Cl. ..................................... 221/109; 221/241
[58] Field of Search ............... 221/107, 108, 109, 299, 221/124, 241, 242, 266, 256

[56] References Cited

U.S. PATENT DOCUMENTS

| | | | |
|---|---|---|---|
| 913,151 | 2/1909 | Neher | 221/299 X |
| 1,666,849 | 4/1928 | Fry | 221/242 |
| 2,304,484 | 12/1942 | Smith | 221/109 X |
| 2,376,561 | 5/1945 | Smith | 221/124 |
| 2,513,595 | 7/1950 | Stewart | 221/256 X |
| 2,895,639 | 7/1959 | Little | 221/266 |
| 3,937,361 | 2/1976 | House | 221/242 |

*Primary Examiner*—Stanley H. Tollberg
*Attorney, Agent, or Firm*—John J. Swartz

[57] ABSTRACT

Apparatus for individually dispensing cylindrical articles, such as rolled newspapers and the like, comprising vertically inclined, juxtaposed racks for storing articles which travel therealong by the force of gravity, and an adjustable width chute adjacent the terminal ends of the racks and spaced therefrom to receive articles from the rack and downwardly pass them in a vertical stack, a gate movable between a blocking position in the path of the lowermost article in the column and a non-blocking position permitting the lowermost article to downwardly pass, and stack support mechanism movable between a remote position when the gate is in the blocking position and an operative position in the path of the second lowermost article when the gate is in the non-blocking position to interrupt the downward passage and vertically support the balance of the articles which trail the lowermost article.

15 Claims, 7 Drawing Figures

APPARATUS FOR DISPENSING ROLLED NEWSPAPERS AND THE LIKE

FIELD OF THE INVENTION

This invention relates to article dispensing apparatus for individually dispensing generally cylindrical articles, such as rolled newspapers and the like, and more particularly, to article dispensing apparatus which can be adjusted to accommodate cylindrical articles having differing diameters.

BACKGROUND OF THE INVENTION

Newspapers are conventionally folded, stacked, and displayed for sale, in a newspaper stand having a door, which when opened, provides free access to all of the papers in the newspaper stand.

Frequently, although an individual will deposit only enough money to purchase one newspaper, several newspapers will be removed from the stack and thus, the newspaper distributors incur substantial losses. Newspapers and magazines are sometimes rolled into a cylindrical shape and then banded via a cylindrical protective sheath, such as paper or the like.

Article dispensing or vending devices have been provided heretofore such as disclosed in U.S. Pat. No. 2,442,025 granted to Harvey J. Smith on May 25, 1948; U.S. Pat. No. 3,368,714 granted to W. J. Wingate, et al on Feb. 13, 1968; U.S. Pat. No. 2,562,015 granted to L. J. C. Cattanach on July 24, 1951; and U.S. Pat. No. 3,938,700 granted to Camp, et al on Feb. 17, 1976. The prior art article dispensers dispense articles which consistently have the same diameter. In the newspaper and magazine industry, it is rather common that the number of pages, and thus the overall diameter of the rolled newspapers and magazines, vary with each publication. It is quite common, for example, that the Sunday edition of many newspapers has substantially more pages than do the editions published during the week.

Accordingly, it is an object of the present invention to provide new and novel apparatus for individually dispensing cylindrical articles, such as a rolled newspaper and the like, and thus, minimize loss due to theft.

Another object of the present invention is to provide a coin operated vending machine of the type described which can be easily bulk loaded and unloaded.

It is another object of the present invention to provide article dispensing apparatus which can be adjusted to individually receive and dispense successive cylindrical articles having differing diameters.

A further object of the present invention is to provide apparatus for individually dispensing rolled papers, and the like, including a gravity feed magazine which receives and stores a plurality of vertically disposed rolled papers, a gate, adjacent the magazine, which can be opened and closed to selectively permit the lowermost rolled paper in the magazine to fall by gravity, and a device for interrupting the passage of the rolled papers trailing the lowermost rolled paper when the gate is open, but permitting the downward passage of trailing rolled papers toward the gate when the gate is closed.

A still further object of the present invention is to provide article dispensing apparatus for dispensing rolled articles, such as newspapers and the like, including new and novel divider mechanism for separating the lowermost article from a column of rolled articles.

A still further object of the present invention is to provide article dispensing apparatus of the type described including a plurality of superposed, vertically inclined, rolled paper supporting racks, a generally vertically disposed chute for receiving the cylindrical articles from the racks and downwardly passing the articles in a column, and mechanism for adjusting the transverse width of the chute to accommodate articles having differing diameters.

Another object of the present invention is to provide article dispensing apparatus for dispensing generally cylindrical articles, such as rolled newspapers and the like, including a plurality of superposed, vertically inclined racks, generally vertical, guide members adjacent the lower ends of the racks which cooperate with the racks to define a vertically disposed, article receiving chute; apparatus for individually releasing the articles from the lower end of the chute; and mechanism mounting the guide members and the racks for relative movement toward and away from each other to adjust the width of the chute.

These and other objects of the present invention will become more readily apparent to one of ordinary skill in the art as the description thereof proceeds.

SUMMARY OF THE INVENTION

Apparatus for individually dispensing generally cylindrical articles, such as rolled newspapers or the like, comprising: at least a pair of juxtaposed, vertically inclined, article supporting racks, each having an upper end and a lower terminal end whereby articles supported thereon travel by force of gravity therealong towards the lower end; upstanding guide mechanism, adjacent, but spaced from, the lower terminal rack ends to provide a vertical chute for receiving articles from the racks and downwardly passing the articles in a generally vertical column, and mechanism adjustably mounting the guide mechanism and the racks for relative movement toward and away from each other to adjust the width of the chute and accommodate articles of varying diameters. One aspect of the invention includes mechanism for permitting the discharge of the lowermost article in the column while preventing downward movement of the trailing articles in the column.

BRIEF DESCRIPTION OF THE DRAWINGS

The present invention may more readily be understood by reference to the accompanying drawings in which.

DESCRIPTION OF THE EMBODIMENT

Figure 4:
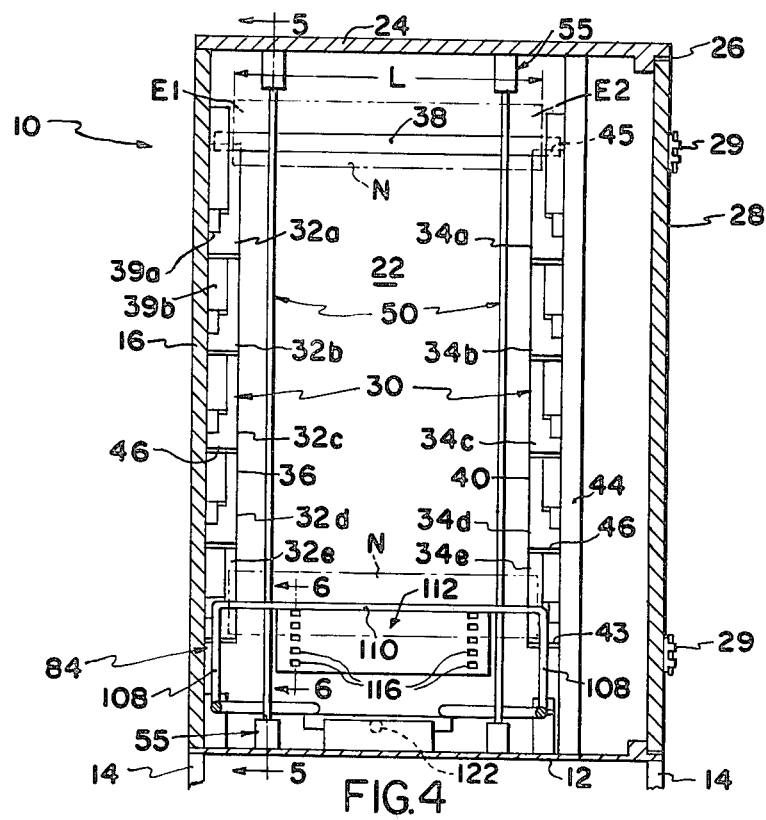
FIG. 4 is a sectional end view, taken along the line 4—4 of FIG. 1.

Apparatus constructed according to the present invention, generally designated 10, includes a closed box, generally designated 11, having a generally rectangular, bottomwall 12, supported by four corner mounted support legs 14, mounting sidewalls 16 and 18 spanned by front and rear walls 20 and 22 and a topwall 24. The sidewall 18 includes a door opening 26 which receives a door 28 swingably mounted on the sidewall 18 via suitable hinges 29 (FIG. 4). A lock (not shown), of suitable construction, is provided to selectively prevent unauthorized access to the inside of the box 11 when the door 28 is closed. A newspaper display rack 27, having a transparent wall 25, may suitably be mounted on the outside of frontwall 20 to receive a folded paper F representing the edition being dispensed.

A plurality of vertically inclined, superposed shelves, generally designated 30, are provided for supporting a plurality of rolled newspapers or magazines, generally designated N. The newspapers or magazines N are each rolled into a generally cylindrical shape and banded with a thin cylindrical paper sheath S and thus, constitute the articles to be dispensed. The shelves 30 are individually more particularly identified by the reference characters 30a-30e respectively. Each of the shelves 30 include a pair of laterally spaced apart, vertically inclined, article supporting racks identified by the reference characters 32, 34 followed by letter subscripts corresponding to the letter subscripts a, b, c, d, and e, associated with the reference characters identifying the respective shelves 30a-30e.

Figure 3:
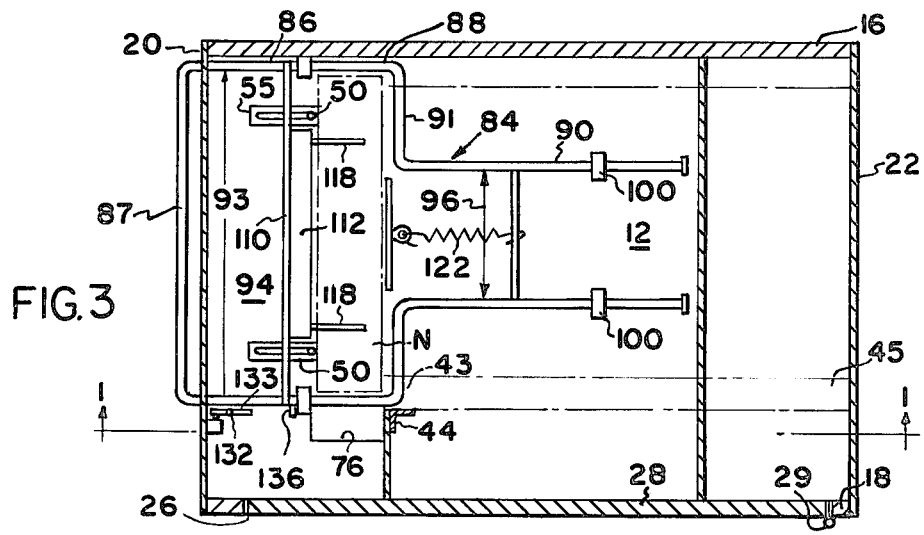
FIG. 3 is a top plan sectional view, taken along the line 3—3 of FIG. 1.

The racks 32a-32e each include a vertically inclined, newspaper supporting flange portion 36, welded or otherwise suitably fixed to the box sidewall 16, for supporting ends E1 (FIG. 4) of the rolled papers N. The racks 34a-34e each include a vertically inclined, newspaper supporting flange 40, welded at the lower ends 43 thereof (FIGS. 3 & 4) to a vertically disposed angle bracket 44 spanning the top and bottom walls 12 and 24, for supporting the opposite ends E2 of the rolled newspapers N. The opposite or upper ends 45 of the newspaper guide flanges 40 are welded to the rearwall 22.

The article supporting shelves 30 are vertically inclined at such an angle that rolled papers N, supported thereon, will move downwardly therealong under the force of gravity. Freely swingably mounted on the underside of the terminal end 46 of each article supporting shelf 30a-30d, via hinges 47, is a stop or door plate 48 which depends downwardly into the path of the rolled newspapers N on the subadjacent shelves 30b-30e respectively for a purpose to become apparent hereinafter.

A cylindrical bar 38 of steel stock or the like is also supported by the article supporting flanges 36, 40 in rolling engagement with the uppermost rolled newspaper N on each shelf 30 to continually downwardly urge the newspapers N supported by the racks 30. Roller guides, generally designated 39, are mounted vertically adjacent the shelves 30 and include a vertical flange 39a and lateral flange 39b parallel with the article supporting flanges 32a-32e and 34a-34e. It should be noted that the lateral width 41 of guide flanges 39b is less than the lateral width 42 of the article supporting flanges 36, 40. The axial length of the cylindrical bars 38 is greater than the length L of the newspapers being dispensed so that the newspapers N will be disposed between the laterally opposed flanges 39b and the ends 38a of the bar stock 38 are received between the vertically spaced, guide flanges 39b and the article supporting flanges 36, 40.

Figures 5, 6, 7:
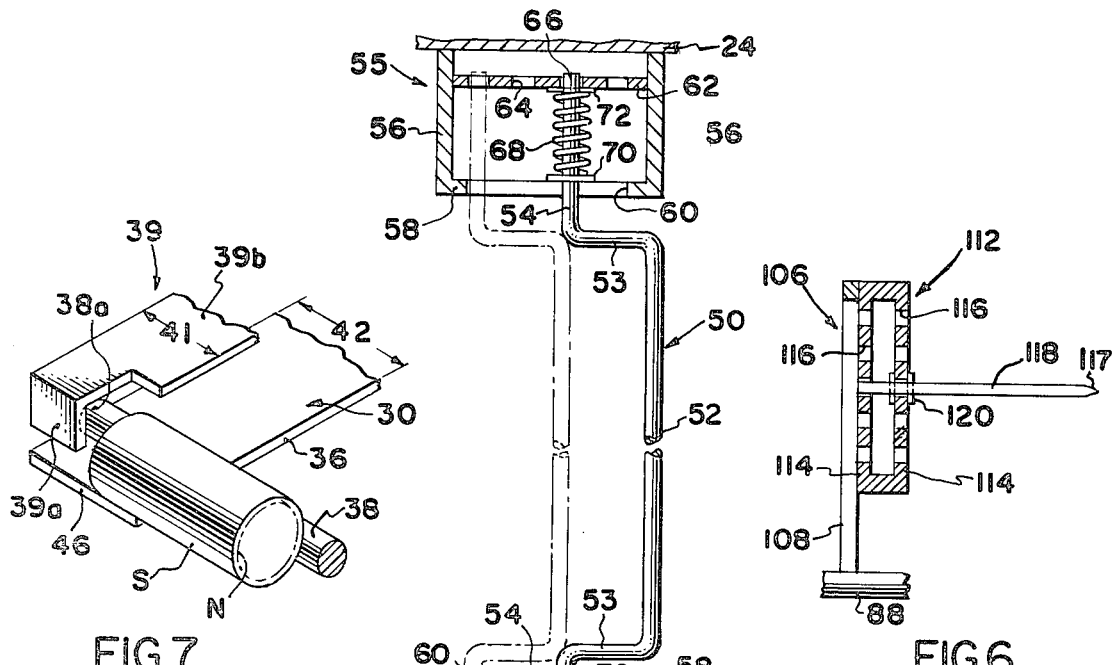
FIG. 5 is a greatly enlarged, sectional side elevational view, taken along the line 5—5 of FIG. 4, more particularly illustrating one of the adjustable chute defining members.
FIG. 6 is an enlarged fragmentary, sectional side elevational view, taken along the line 6—6 of FIG. 3.
FIG. 7 is a fragmentary, perspective view of the lower end of one of the article supporting racks, a paper forwarding roller bars, and the roller guide, part of the roller guide being broken away to better illustrate the underlying roller bar.

The lower ends of the roller guide flanges 39b include vertically disposed stops 39a (FIG. 7) disposed in the paths of the ends 38a of cylindrical bars 38 to interrupt the downward rolling movement thereof when the newspapers N supported by the shelves 30 have cleared the shelves.

Mounted adjacent to, but spaced from, the terminal ends 46 of the article supporting shelves 30, is a pair of generally upstanding, laterally spaced apart, guide rods, generally designated 50 (FIGS. 1 & 5) including central, vertically disposed portions 52 and vertical terminal end portions 54 coupled to the central portions via offset portions 53. The guide rods 50 are mounted on the frame or box 11 via upper and lower, generally U-shaped mounting members 55 provided on the lower and upper walls 12 and 24. The U-shaped mounting members 55 each includes vertical sideplates 56 spanned at the vertical inner ends by an endplate 58 having an elongated slot 60 therein for slidably receiving the offset vertical end portions 54 of guide rods 50.

Spanning the endplates 56 vertically outwardly of the end plate 58 is a transverse plate 62 include a plurality of spaced apart apertures 64 therethrough for receiving the terminal ends 66 of the offset end portions 54. The guide rods 52 are releasably secured in the slots 60 and apertures 64 via coil springs 68 which are received by the offset rod portions 54 and secured between the plates 58 and 62 by a pair of ring shaped washers 70 and 72. The ring shaped washers 70, 72 are received by the offset rod portions 54 and have an external diameter greater than the diameter of the holes 64 and the width of the slot 60. When it is desired to reposition the rods 50 from the positions, illustrated in solid lines in FIG. 5, to the positions illustrated in chain lines in FIG. 5, the rods 50 are moved vertically, firstly in one direction, for example downwardly, to compress the springs 68 until the upper terminal rod ends 66 clear the upper openings 64 permitting movement of the upper terminal rod ends 66 to the position illustrated in chain lines in FIG. 1 where they are received by other apertures 64. The rods 50 are then moved upwardly to again compress the coil springs 68 until the lower terminal rod ends 66 clear the lower openings 64 permitting transverse movement of the lower rod ends 66 to the positions illustrated in chain lines in FIG. 5 where they are received by other apertures 64. In the thus adjusted positions, the coil springs 68 yieldably secure the rods 50. The guide rods 50 thus define, together with the terminal ends 46 and the stops 48, a vertical chute or chimney 74 for receiving the rolled newspapers N from the shelves 30 and downwardly passing them in a vertical column toward a discharge opening 76, provided in the bottomwall 12, which is vertically aligned with the chute 74. A curvilinear tray 78 is mounted on the underside of bottomwall 12 adjacent the opening 76 for guiding the dispensed rolled papers N to a terminal, paper receiving, access shelf 80 having a paper retaining lip 82 thereon.

To control the downward flow of rolled newspapers N in the chute 74, a gate, generally designated 84, is provided and includes a pair of laterally spaced apart, generally horizontal, rods, generally designated 86 (FIGS. 1-3), including generally parallel, outer portions 88 slidably received by apertures 89 provided in the box frontwall 20 and spanned by a handle 87 (FIG. 3) externally of the box frontwall 20. The outermost rod portions 88 are spaced apart a distance 93 which is greater than the axial length L of the rolled newspapers N. The outer rod portions 88 of gate 84 thus define therebetween a newspaper receiving opening 94 which, when aligned with the vertical chute 74 and the discharge opening 76 (as illustrated in FIG. 1), permits the free downward passage of the rolled newspapers N in the chute 74 to the discharge opening 76.

The laterally spaced apart, rods 86 include generally parallel, inner, laterally spaced apart portions 90 coupled to the longitudinally outer portions 88 via offset portions 91. The inner rod portions 90 of gate 84 are spaced apart a distance 96 substantially less than the length L of newspapers N so that when the gate 84 is moved to the position illustrated in FIG. 2 and the inner rod portions 90 are vertically aligned with the chute 74 and the discharge opening 76, the lowermost newspaper N1 supported thereon is not permitted to pass downwardly from the chute 74 to the opening 76. The rod portions 88 and 90 are slidably received in openings 98 provided in guide brackets 100 mounted on the lowermost wall 12. The rods 86 are thus slidably, reciprocally movable between the retracted newspaper blocking position illustrated in FIG. 2 in which the offset inner rod portions 90 are vertically aligned with the chute 74 and discharge opening 76 so that the lowermost rolled newspaper, identified by the reference character N1, is supported thereby, and an advance or forward newspaper releasing position, illustrated in FIG. 1, in which the lowermost newspaper N1 previously supported by the rod portions 90 is permitted to freely pass downwardly through the newspaper receiving opening 94 between the rod portions 88 to the discharge opening 76.

Figure 1:
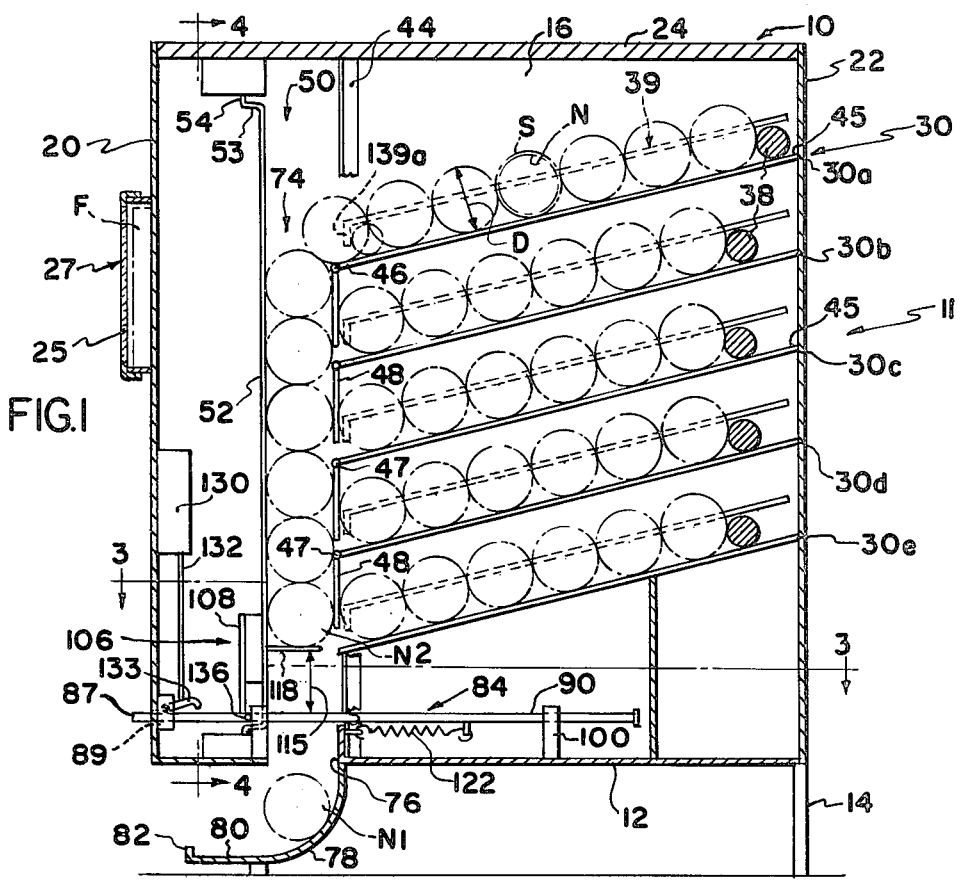
FIG. 1 is a sectional, side elevational view, taken along the line 1—1 of FIG. 3, illustrating the gate and article divider mechanism in an advance position in which the lowermost lead paper is dispensed and the trailing rolled papers are supported.

Newspaper divider and stack supporting mechanism generally designated 106, is provided for interrupting the flow or passage of the balance of the stack of rolled papers N trailing the lowermost rolled newspaper N1 when the gate 84 is moved to the non-blocking or newspaper releasing position illustrated in FIG. 1. The mechanism 106 includes a pair of vertical rods 108 (FIGS. 3 & 6), mounted on the parallel, stack supporting rod portions 88, spanned by cross bars 110 for supporting the balance of the stack trailing the lowermost rolled paper N1. A mounting bracket, generally designated 112, is dependently supported by the crossbars 110 and includes a pair of spaced apart plates 114 having a series of aligned, vertically spaced, apertures 116 therein for releasably receiving a pair of inwardly projecting newspaper dividing spikes 118. The newspaper divider stack support spikes 118 are releasably secured in any selected ones of the apertures 116 via pins 120 slidably received in openings provided in the spikes 118. The spikes 118 are vertically positioned so that the vertical distance 115 between rods 86 and the terminal, pointed ends 117 of spikes 118 is substantially equal to the diameter of the newspaper roll N. As will be readily apparent, as the gate mechanism 84 moves forwardly to the position illustrated in FIG. 1 to release the lowermost rolled paper N1, the spikes or projections 118 will pass between the lowermost rolled paper N1 and the immediately following rolled newspaper N2 to divide lowermost newspaper N1 from the balance of the stack of rolled newspapers to support the balance of the stack and thus preclude the rolled papers N trailing the lowermost rolled newspaper N1 in chute 74 from moving downwardly when the lowermost rolled newspaper N1 passes through the space 94 between the rod portions 88. The terminal ends 117 of the spikes 118 converge to an edge which is disposed vertically above the opening 94 in such position that at least the terminal ends 117 underlie a portion of the second lowermost newspaper N2 before the lowermost newspaper N1 passes through the opening 94.

Figure 2:
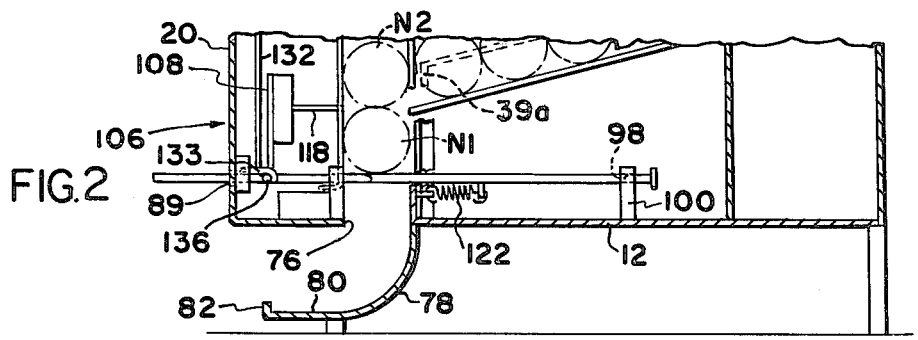
FIG. 2 is a fragmentary, sectional, side elevational view, similar to FIG. 1, illustrating the gate and article divider mechanism in retract positions in which the entire column of rolled papers is vertically supported by the gate mechanism.

Gate return coil springs 122 are coupled between the lower box wall 12 and the inner, parallel rod portions 90 of gate 84 to yieldably maintain the gate mechanism 84 in the retracted position illustrated in FIG. 2, but permitting the forward movement of the gate mechanism 84 to the releasing position illustrated in FIG. 1. As the gate mechanism 84 moves forwardly to the releasing position illustrated in FIG. 1, the divider and stack support mechanism 106 concurrently moves forwardly to a position between the lowermost rolled paper N1, supported by the rod portions 90, and the immediately trailing, rolled paper N2 to preclude the downward movement of, and vertically support, the column or stack of articles N in the stack 74 until such time as the gate 84 is retracted to the position illustrated in FIG. 2.

A coin operated mechanism, schematically designated 130, is mounted on the front wall 20 and includes a pair of vertically movable rods 132 coupled, at the lower ends thereof to a pair of hooks 133 pivotally mounted on the inside of front wall 20, for movement between the raised positions illustrated in FIG. 1 permitting forward movement of rod portions 88 and lowered positions illustrated in FIG. 2 precluding forward movement of the gate 84. In the lowered positions illustrated in FIG. 2, the hooks 133 receive laterally outwardly projecting pins 136 mounted on rod portions 88 to lock the rods 86 in the retract positions. The coin operated mechanism may suitably be of the type manufactured by National Rejectors, Inc. and sold under Model Number 1-15-022, Identification No. 13-03-032 and more particularly described in the Service Manual Parts List Fleetwood Cigarette Vendor, Fawn Sales Inc., P. O. Box 1333, 8040 University Blvd, Des Moines, Iowa.

The operation of the coin operated mechanism is such that when the proper amount and type of coins are placed in the coin dispenser 130, the rods 132 will elevate to move the hooks 133 to positions removed from the pins 136 whereby the handle 87 and the rods 86 may be moved inwardly from the blocking position illustrated in FIG. 2 to the paper dispensing position illustrated in FIG. 1.

As is now more readily apparent, if rolled papers N are disposed in the chute 74 between the swingable stop 48 and the guide rods 50, the stop 48 is precluded from swinging outwardly toward the guide rods 50 until the rolled papers N disposed in chute 74 pass downwardly to a level below the stop 48. For example, when the cylindrically shaped papers fill the chute 74, as illustrated in FIG. 1, the stops 48 cannot swing outwardly into the chute 74 as swinging movement thereof is interrupted by the rolled papers N disposed in the chute 74. When all of the rolled newspapers N on the uppermost shelf 30a have moved to a level below the level of the uppermost stop or door 48, the force exerted on the uppermost door 48 by the newspapers N and cylindrical bar 38 supported by the shelf 30b will force the uppermost stop 48 to swing outwardly into the chute 74 permitting the newspapers N on the shelf 30b to enter the chute 74. When all the newspapers supported by the shelf 30b pass to a level below the level of the second uppermost gate 48, the second uppermost gate 48 will outwardly swing into chute 74 and the newspapers N supported by racks 30c will then freely roll into the chute 74.

THE OPERATION

With the side access door 28 open, the newspaper delivery person will adjust the guide rods 50 to a proper position in apertures 64 depending on the diameter D of the rolled papers N being dispensed. The guide rods 50 are positioned so that the distance between the guide rods 50 and the terminal ends 46 of the racks 30 is slightly greater than the diameter D of the rolled papers N. It will be assumed that the gate 84 will initially be disposed in the retract, newspaper blocking position illustrated in FIG. 2 with the inner rod portions 90 of gate 84 in vertical alignment with the chute 74 and the discharge opening 76. The delivery person will then load the rolled papers into the machine by initially placing the lowermost newspaper N1 in chute 74 to be vertically supported by the inner gate rod portions 90 at a level below the spikes 118. The delivery person will then stack additional newspapers N thereabove to firstly load the chute 74. After the chute 74 is fully loaded, the bar of roll stock 38 is moved to the upper end of guide 39 and the uppermost shelf 30a is loaded with newspapers N. The bar 38 is then released to bear against the trailing newspaper N supported by the shelf 30a to urge the papers toward chute 74. The lowermost shelves 30b–30e are then loaded with newspapers N until the machine is fully loaded, as illustrated in FIG. 1. The door 28 is then closed and locked.

When an individual desires to purchase a paper, he merely inserts the proper coin or coins into the coin operated device 130 whereby the rods 132 and gate hooks 133 are elevated to release the gate 84. The newspaper purchaser then forwardly pushes the handle 87 forcing the gate 84 forwardly against the biasing force of return springs 122 to vertically align the newspaper receiving opening 94 (between the rod portions 88) with the chute 74 and the discharge opening 76. At this time, the lowermost newspaper N1 will drop through the paper receiving opening 94 and the aligned discharge opening 76 and the paper supporting shelf 78 where it can be readily removed by the purchaser. As the paper release gate 86 moves forwardly, the stack supporting paper divider spikes 118 concurrently move to positions underlying a portion of the second lowermost rolled paper N2, and thus precludes the second lowermost rolled paper N2 and the superjacent rolled papers N supported thereby from moving downwardly. As the purchaser retracts the handle 87 to the position illustrated in FIG. 2, the divider spikes 118 will clear the underside of rolled paper N2 and the remaining stack or column of rolled papers N will index downwardly so that the rolled paper N2 is supported by the rod portions 90, 91.

The operation will be repeated by subsequent purchasers until all of the rolled papers N supported by the uppermost shelf 30a have passed to a level below the level of the uppermost stop 48. The vertical stops 43 will prevent passage of the cylindrical bar 38 into the chute 74. The rolled papers N and cylindrical bar 38 supported by the shelf 30b will then force the uppermost door 48 to swing outwardly to the position illustrated in chain lines in FIG. 1 permitting the rolled papers N on the shelf 30b to roll downwardly into the chute 74. When all the rolled papers N supported by each shelf 30 clear the immediately underlying stop 48, the papers N on the immediately underlying shelf will then pass into the chute 74. This operation will be continued until the box is empty.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. Article dispensing apparatus for individually dispensing generally cylindrical articles, such as rolled newspapers, comprising:

at least upper and lower superposed, vertically inclined article supporting racks, each having an upper end and a lower end;

means mounting said racks at such an angle that articles supported thereon will travel, by force of gravity, toward said lower end;

vertically disposed article guide means, spaced from said lower ends of said racks, defining, with portions of said racks, a generally vertically disposed chute for receiving said articles from said racks and passing them downwardly in a stack; said chute having a discharge opening at the lower end thereof for serially passing the articles in said column;

stop means mounted adjacent said lower end of said lower rack for movement between a first position preventing movement of said articles supported by said lower rack into said chute while an article passing into said chute from said upper rack is disposed between said stop means and said article guide means and a second position, when all articles passing to said chute from said upper rack are disposed at a level below the level of said stop means permitting articles to be gravity fed from said lower rack to said chute;

gate means adjacent said discharge opening movable between a blocking position interrupting the downward passage of said column of articles in said chute and a non-blocking position permitting the articles to serially pass through said discharge opening;

stack support and divider means coupled to said gate means for movement therewith between a remote position, when said gate means is in said blocking position, permitting the downward passage of articles in said chute to said gate means and an operative position interrupting the passage of, and vertically supporting, the articles trailing the lowermost article when said gate means is in said non-blocking position such that only the lowermost article is dispensed through said discharge opening;

said gate means including barrier means, disposed in the path of said lowermost article when said gate means is in said blocking position;

said barrier means having an opening therein receiving and passing said lowermost article when said gate means is in said non-blocking position; and means adjustably mounting said stack support and divider means on said gate means in any selected one of a plurality of different vertical positions to selectively adjust the vertical distance between said barrier means and said divider means.

2. Article dispensing apparatus for individually dispensing generally cylindrical articles, such as rolled newspapers, comprising:

at least upper and lower superposed, vertically inclined article supporting racks, each having an upper end and a lower end;

means mounting said racks at such an angle that articles supported thereon will travel, by force of gravity, toward said lower end;

vertically disposed article guide means, spaced from said lower ends of said racks, defining, with portions of said racks, a generally vertically disposed chute for receiving said articles from said racks and passing them downwardly in a stack; said chute having a discharge opening at the lower end thereof for serially passing the articles in said column;

stop means mounted adjacent said lower end of said lower rack for movement between a first position preventing movement of said articles supported by said lower rack into said chute while an article passing into said chute from said upper rack is disposed between said stop means and said article guide means and a second position, when all articles passing to said chute from said upper rack are disposed at a level below the level of said stop means permitting articles to be gravity fed from said lower rack to said chute;

gate means adjacent said discharge opening movable between a blocking position interrupting the downward passage of said column of articles in said chute and a non-blocking position permitting the articles to serially pass through said discharge opening;

stack support and divider means coupled to said gate means for movement therewith between a remote position, when said gate means is in said blocking position, permitting the downward passage of articles in said chute to said gate means and an operative position interrupting the passage of, and vertically supporting, the articles trailing the lowermost article when said gate means is in said non-blocking position such that only the lowermost article is dispensed through said discharge opening; and means adjustably mounting said guide means and said racks for relative movement toward and away from each other between any one of a plurality of different, spaced apart positions to adjust the width of said chute;

said guide means comprising upstanding rod means and said mounting means comprising upper and lower receptacles receiving the upper and lower ends of said rod means, and spring means yieldably releasably securing said rod means in said receptacles;

said gate means comprising a pair of laterally spaced apart bars including first portions, spaced apart a first predetermined distance less than the length of said articles for supporting said articles trailing said lowermost article when said stack support divider means is in said inoperative position and second portions spaced apart a greater predetermined distance greater than the length of said articles for passing said lowermost article when said stack support and divider means is in said operative position.

3. The article dispensing apparatus set forth in claim 1 wherein said stack support and divider means comprises projection means normally permitting the downward passage of said articles when said stack support and divider means is in said remote position but projecting to a position above a portion of said opening in said barrier means a sufficient distance such that, when said barrier means moves to a position in which the lowermost article can freely pass through said opening in said barrier means, said projection means is in a position underlying a portion of the article immediately trailing the lowermost article in said chute.

4. Article dispensing apparatus for individually dispensing generally cylindrical articles, such as rolled newspapers, comprising:

at least upper and lower superposed, vertically inclined article supporting racks, each having an upper end and a lower end;

means mounting said racks at such an angle that articles supported thereon will travel, by force of gravity, toward said lower end;

vertically disposed article guide means, spaced from said lower ends of said racks, defining, with portions of said racks, a generally vertically disposed chute for receiving said articles from said racks and passing them downwardly in a stack; said chute having a discharge opening at the lower end thereof for serially passing the articles in said column;

stop means mounted adjacent said lower end of said lower rack for movement between a first position preventing movement of said articles supported by said lower rack into said chute while an article passing into said chute from said upper rack is disposed between said stop means and said article guide means and a second position, when all articles passing to said chute from said upper rack are disposed at a level below the level of said stop means permitting articles to be gravity fed from said lower rack to said chute;

gate means adjacent said discharge opening movable between a blocking position interrupting the downward passage of said column of articles in said chute and a non-blocking position permitting the articles to serially pass through said discharge opening;

stack support and divider means coupled to said gate means for movement therewith between a remote position, when said gate means is in said blocking position, permitting the downward passage of articles in said chute to said gate means and an operative position interrupting the passage of, and vertically supporting, the articles trailing the lowermost article when said gate means is in said non-blocking position such that only the lowermost article is dispensed through said discharge opening;

said gate means comprising a pair of laterally spaced apart bars including first portions, spaced apart a first predetermined distance less than the length of said articles for supporting said articles trailing said lowermost article when said stack support divider means is in said inoperative position and second portions spaced apart a greater predetermined distance greater than the length of said articles for passing said lowermost article when said stack support and divider means is in said operative position.

5. Apparatus for individually dispensing generally cylindrical articles, such as rolled newspapers, comprising:
- a magazine, mounted on said frame for receiving and storing a stack of generally cylindrical articles, including a lower end having a discharge opening for discharging said articles;
- said magazine being inclined such that articles stored thereon will be gravity fed downwardly seriatim toward said discharge opening;
- gate means, movable between a blocking position interrupting the downward flow of articles and a non-blocking position permitting the articles to serially pass through said opening;
- stack support means movable between a remote position when said gate means is in said blocking position, and an operative stack support position supporting the balance of the stack of articles trailing the lowermost article when said gate means is in said removed position such that only the lowermost article is dispensed through said discharge opening;
- said gate means including barrier means disposed in the path of said lowermost article when said gate means is in said blocking position;
- said barrier means including an opening therethrough for receiving and passing the lowermost article in said chute when said gate means is in said non-blocking position; and
- means for adjustably mounting said divider means on said gate means in any selected one of a plurality of vertically spaced positions such that the distance between said barrier means and said divider means can be adjusted to accomodate articles of different diameters.

6. Apparatus for individually dispensing generally cylindrical articles, such as rolled newspapers, comprising:
- a magazine, mounted on said frame for receiving and storing a stack of generally cylindrical articles, including a lower end having a discharge opening for discharging said articles;
- said magazine being inclined such that articles stored thereon will be gravity fed downwardly seriatim toward said discharge opening;
- gate means, movable between a blocking position interrupting the downward flow of articles and a non-blocking position permitting the articles to serially pass through said opening;
- stack support means movable between a remote position when said gate means is in said blocking position, and an operative stack support position supporting the balance of the stack of articles trailing the lowermost article when said gate means is in said removed position such that only the lowermost article is dispensed through said discharge opening;
- said gate means including barrier means disposed in the path of said lowermost article when said gate means is in said blocking position;
- said barrier means including an opening therethrough for receiving and passing the lowermost article in said chute when said gate means is in said non-blocking position;
- said support means comprising projection means projecting over a portion of said opening in said barrier means to a position in which at least the terminal end of said barrier means will underlie a portion of the second lowermost article before the lowermost article passes through said opening in said barrier means.

7. Apparatus for individually dispensing generally cylindrical articles, such as rolled newspapers, comprising:
- a magazine, mounted on said frame for receiving and storing a stack of generally cylindrical articles, including a lower end having a discharge opening for discharging said articles;
- said magazine being inclined such that articles stored thereon will be gravity fed downwardly seriatim toward said discharge opening;
- gate means, movable between a blocking position interrupting the downward flow of articles and a non-blocking position permitting the articles to serially pass through said opening; and
- stack support means movable between a remote position when said gate means is in said blocking position, and an operative stack support position supporting the balance of the stack of articles trailing the lowermost article when said gate means is in said removed position such that only the lowermost article is dispensed through said discharge opening;
- said gate means including barrier means disposed in the path of said lowermost article when said gate means is in said blocking position;
- said barrier means including an opening therethrough for receiving and passing the lowermost article in said chute when said gate means is in said non-blocking position;
- said magazine including at least first and second juxtaposed, vertically inclined racks, having upper and lower terminal ends and generally upstanding guide means adjacent but spaced from the lower ends of said racks providing a vertically disposed chute permitting articles on said racks to serially pass downwardly to said opening; and
- means adjustably mounting said guide means and said racks for relative movement toward and away from each other to adjust the width of said chute and accomodate articles of varying sizes.

8. The article dispensing apparatus set forth in claim 4 wherein the lateral width of said divider means comprising a pair of divider spikes spaced apart a distance less than said greater predetermined distance and less than the length of said articles.

9. The dispensing apparatus set forth in claim 6 including a cylindrical bar of stock supported by each of said racks rearward of the vertically uppermost article on each rack for rolling movement towards said chute to urge said articles toward said chute; guide means for guiding the travel of said bar; a stop for preventing the passage of said bar into said chute.

10. The apparatus set forth in claim 6 wherein said magazine includes at least a pair of juxtaposed, vertically inclined article supporting racks each having an upper end and a lower terminal end whereby articles supported thereon travel by force of gravity therealong toward said lower end;
- adjustable width chute means including upstanding guide means adjacent, but spaced from, said lower terminal ends to provide a vertical passage for receiving articles from said racks and downwardly passing said articles in a generally vertical stack; and means adjustably mounting said guide means and said racks for relative movement toward and away from each other to adjust the width of said passage and accomodate articles of varying sizes.

11. The apparatus set forth in claim 10 wherein said upstanding guide means comprises a pair of upstanding rods having upper and lower ends; said mount means comprising a plurality of spaced apart receptacles for releasably receiving said upper and lower ends; and means yieldably, releasably securing said terminal ends in said receptacles.

12. The apparatus set forth in claim 10 including stop means mounted adjacent said lower end of the lowermost one of said racks for movement between a first position blocking the flow of articles from said lowermost rack to said passage when articles in said passage from the uppermost one of said racks are disposed between said stop means and said guide means and a second position permitting the passage of articles from said lowermost rack to said passage when all articles from the uppermost rack have moved to positions below the level of said stop means.

13. The apparatus set forth in claim 12 wherein said stop means is mounted such that the force of one article will urge said stop means to said second position when there are no articles disposed between said stop means and said guide means.

14. The apparatus set forth in claim 12 including gate means movable between a position blocking the downward movement of articles in said passage and a non-blocking position permitting the articles to serially pass downwardly; and stack support means, mounted above said gate means, movable between a remote position, when said gate means is in said blocking position to permit the downward movement of said articles in said passage to said gate means and an operative position supporting the balance of the stack of articles, trailing the lowermost article, when said gate means is in said non-blocking position.

15. The apparatus set forth in claim 1 wherein said gate means comprises barrier means having an opening therein vertically aligned with said passage and being of such size as to vertically pass said articles when said gate means is in said non-blocking position.

* * * * *